United States Patent [19]
Moores, Jr.

[11] Patent Number: 5,089,729
[45] Date of Patent: Feb. 18, 1992

[54] POWER TOOL WITH BRUSH SHIFTING AND REVERSING SWITCH ASSEMBLY

[75] Inventor: Robert G. Moores, Jr., Reisterstown, Md.

[73] Assignee: Black & Decker Inc., Newark, Del.

[21] Appl. No.: 669,699

[22] Filed: Mar. 14, 1991

[51] Int. Cl.$^5$ .............................. H02K 7/14; H01H 9/26
[52] U.S. Cl. .......................................... 310/50; 310/37; 200/1 V
[58] Field of Search ................... 310/50, 46, 47, 67 R, 310/238, 239; 200/1 V, 43.17

[56] References Cited

U.S. PATENT DOCUMENTS

| | | | |
|---|---|---|---|
| 2,764,705 | 9/1956 | Albertson et al. | 310/50 |
| 3,440,465 | 4/1969 | Pratt et al. | 310/50 |
| 3,681,550 | 8/1972 | Perry et al. | 310/50 |
| 4,342,931 | 8/1982 | Grossmann et al. | 310/50 |
| 4,574,471 | 3/1986 | Dibbern, Jr. et al. | 310/50 |
| 4,588,910 | 5/1986 | Baush | 310/50 |
| 4,593,220 | 6/1986 | Cousins et al. | 310/50 |
| 4,748,353 | 5/1988 | Klingenstein et al. | 310/50 |
| 4,772,765 | 9/1988 | Markle et al. | 310/50 |

FOREIGN PATENT DOCUMENTS

| | | | |
|---|---|---|---|
| 0329249 | 8/1989 | European Pat. Off. | 310/50 |
| 0408986 | 7/1990 | European Pat. Off. | 310/50 |
| 4004464 | 1/1991 | Fed. Rep. of Germany | 310/50 |
| 2209885 | 5/1989 | United Kingdom | 310/50 |

*Primary Examiner*—Steven L. Stephan
*Assistant Examiner*—Matthew Nguyen
*Attorney, Agent, or Firm*—Dennis A. Dearing; John D. Del Ponti; Charles E. Yocum

[57] ABSTRACT

A portable, reversibly driven power tool (11) comprises a reversible motor and an assembly (17) for electrically switching the direction of motor rotation and/or for shifting the commutator brushes (99, 101) for optimizing motor performance in both the forward and reverse directions. Assembly (17) includes a reversing switch (56) and an actuator (19) which is movable between forward and reverse positions for reversing the connections of the reversing switch (56) to reverse the direction of motor rotation. Actuator (19) includes (a) a sleeve (81) connected to the reversing (56) switch and surrounding the motor stator (43) to guide movement of the actuator (19) between the forward and reverse positions and (b) a manual control tab (85) ergonomically located in the motor housing (23) slightly forward of a manual power switch (21) in the tool handle (35). The commutator brushes (99, 101) and the rotatable contacts (61, 63) for the reversing switch (56) are preferably supported on a common support (67) and are movable thereon responsive to the movement of the actuator (19) between the forward and reverse positions. Assembly (17) provides a strong, compact construction for electrically switching the direction of motor rotation and/or shifting of commutator brushes (99, 101), an ergonomically preferred remote manual actuator tab (85), easy assembly and a reliable construction.

9 Claims, 6 Drawing Sheets

POWER TOOL WITH BRUSH SHIFTING AND REVERSING SWITCH ASSEMBLY

FIELD OF THE INVENTION

The invention relates to portable electric tools having reversible motors and, more particularly, to improvements in brush shifting and reversing switch assemblies for such motors.

BACKGROUND OF THE INVENTION

In portable electric tools such as portable drills, screwdriver/drills and screwdrivers, it is desirable to reverse the direction of rotation of the motor to facilitate, for example, the loosening and removal of screws, the removal of a drill bit from a hole or the removal of a thread cutting tool out of a bore after cutting a thread in the bore by reverse rotation of the cutting tool.

One conventional method for reversing universal motors is to reverse the electrical connection of the brushes and stator windings. To obtain optimum performance and maximum brush life in a reversing motor, there must be a compensation mechanism for the distortion in the magnetic field, called "neutral plane shift" that results from the interaction of the rotor and stator fluxes. One such mechanism is the shifting of the brush location about the armature axis in the direction that is opposite of the direction of rotation of the armature. Such shifting avoids sparking and excessive brush and commutator wear. In addition, the sparking will cause electrical noise to be transmitted into the power source supplying the electrical energy for the tool.

One such brush shifting and reversing switch assembly is disclosed in U.S. Pat. No. 4,748,353 in which the brush shifting and reversing switch mechanisms are combined into a single assembly. The manual actuator for the mechanism is located on the rear of the motor housing in the plane of the brushes. Such a location has been found to be undesirable for two reasons. First, the location of the manual actuator in this position increases the bulkiness of the motor housing which is undesirable in many portable power tools. Secondly, it has been found that users prefer the actuator to be located just forward of the power (trigger) switch.

SUMMARY OF THE INVENTION

A primary object of the present invention is to provide a compact, reliable ergonomically preferred brush shifting and/or reversing switch assembly.

The present invention is particularly concerned with the provision of an improved actuator in a brush shifting and/or a reversing switch assembly for a power tool with a reversible motor.

In accordance with one aspect of the invention, as embodied and described herein, a power tool comprises a housing, a reversible motor having a stator and an armature rotatable about an axis. A reversing switch for reversing the direction of rotation of the armature comprises a pair of fixed contacts connected to the stator and a pair of rotatable contacts connectable to the armature. An actuator is connected to the rotatable contacts and is movable between a first and second positions for reversing the direction of rotation of the armature. The actuator comprises a sleeve surrounding the stator and rotatable about the armature axis.

The housing may comprise an annular channel coaxial of the armature axis for receiving and guiding movement of the actuator sleeve.

The actuator may comprise an arm extending from the sleeve and engaging a support for the rotatable contacts.

The actuator may further comprise a tab extending outwardly from the sleeve through an opening in the housing and movable between first and second locations corresponding to the first and second actuator positions, respectively. To provide an ergonomically preferred position for the actuator tab, preferably the tab extends through an opening in a bottom wall of a motor section of the housing. A manual switch extends through an opening in a handle section of a housing which (opening) is adjacent to and downwardly and rearwardly of the motor section opening.

To prevent operation of the actuator when the manual power switch is closed, the power switch may comprise a blocking tab for engaging the reversing switch and blocking movement of the rotatable contacts.

In accordance with the preferred embodiment, the brushes for the motor and the rotatable contacts of the reversing switch are mounted on a common support which engages the actuator and supports the rotatable contacts and motor brushes for movement responsive to the movement of the actuator between the first and second positions.

In accordance with another aspect of the invention, a power tool comprises a housing and a reversible motor having a stator and an armature rotatable about an axis and having a commutator disposed at one end of the armature. A brush support is rotatably movable about the armature axis and has a pair of brushes disposed on the support and engagable with the commutator. An actuator is connected to the brush support and is rotatable about the armature axis between first and second positions corresponding to the forward and reverse directions of rotation of the motor armature. The actuator comprises a sleeve surrounding the stator and rotatable about the armature axis. The sleeve guides movement of the actuator between the first and second positions.

Additional objects and advantages in the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in, and constitute a part of, this specification illustrate one embodiment of the invention and together with the description served to explain the principles of the invention. In the drawings, the same reference numerals indicate the same parts.

DESCRIPTION OF THE PREFERRED EMBODIMENT

The preferred embodiment is a portable power tool such as a drill, screwdriver/drill or screwdriver and is used to reversibly drive a tool bit such as a drill bit or screwdriver bit.

Figure 1:
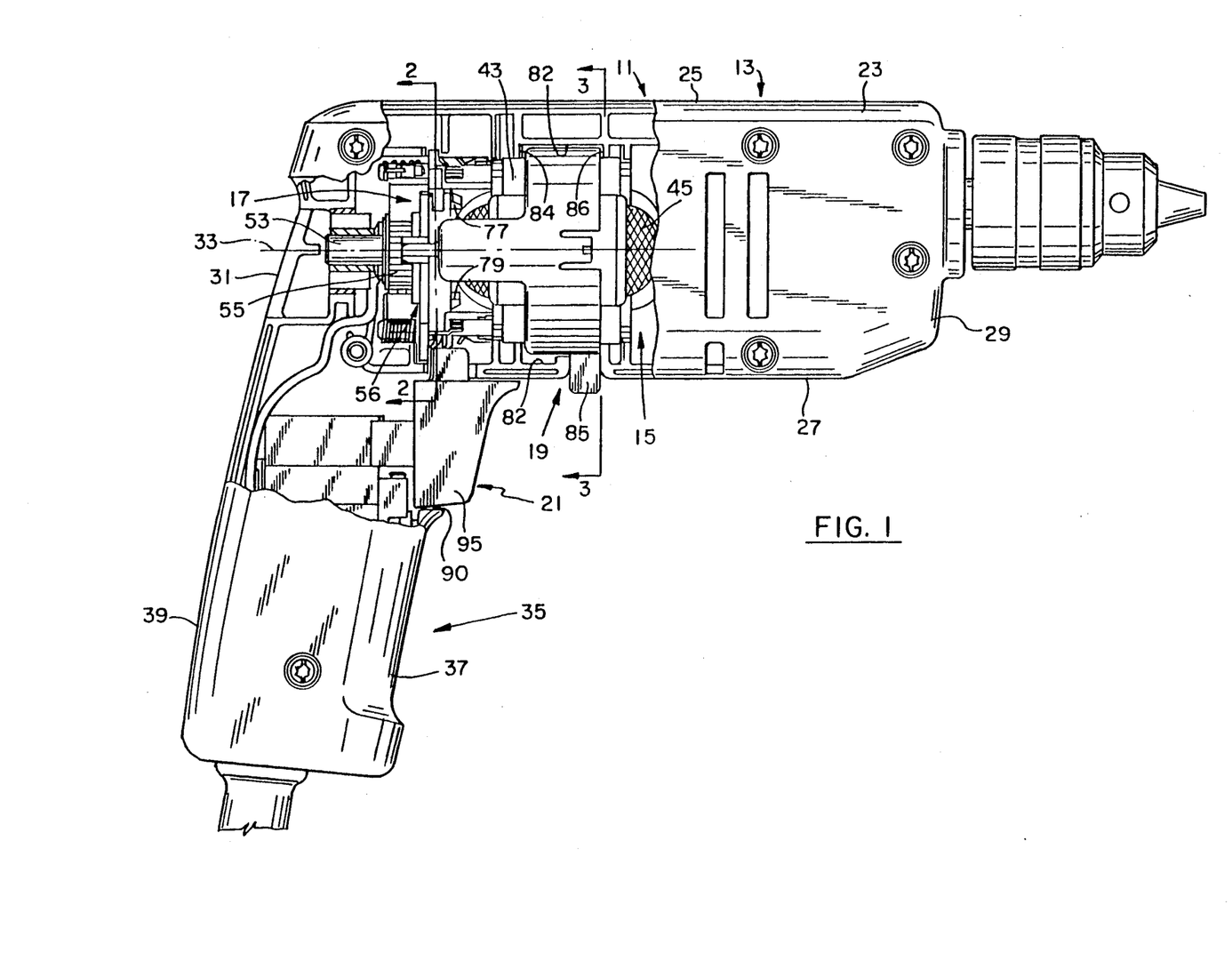
FIG. 1 is a fragmentary side elevational view of a power tool with a brush shifting and reversing switch assembly in accordance with the preferred embodiment of the invention.
Figure 4A:
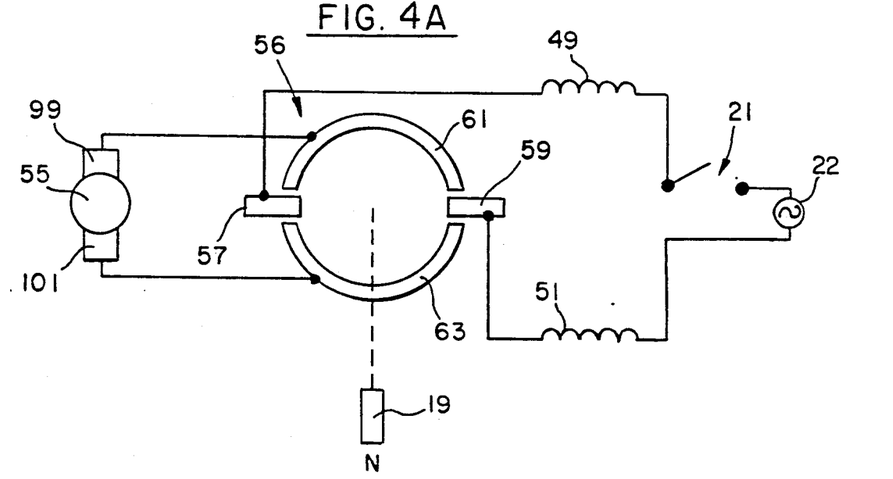
FIGS. 4A, 4B and 4C are a schematic circuit diagram of the reversing switch for the power tool as shown in FIG. 1 and illustrate, respectively, the neutral, forward, and reverse positions of the reversing switch.
Figure 4B:
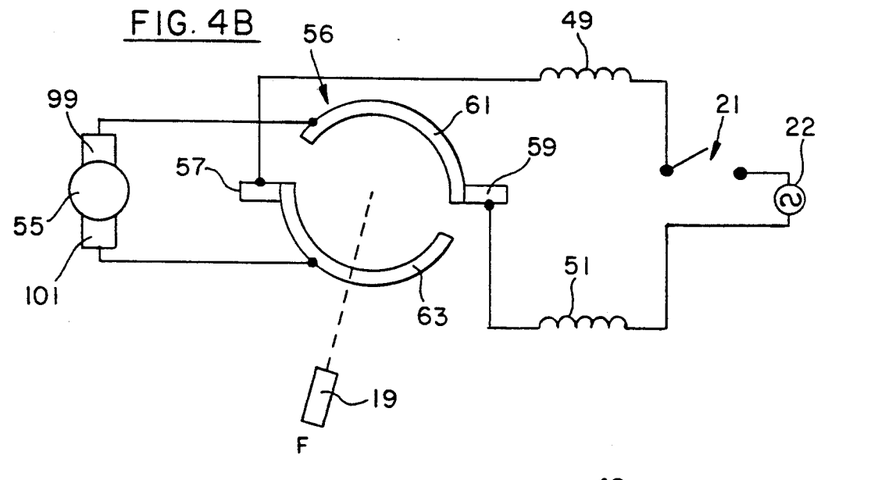
Figure 4C:
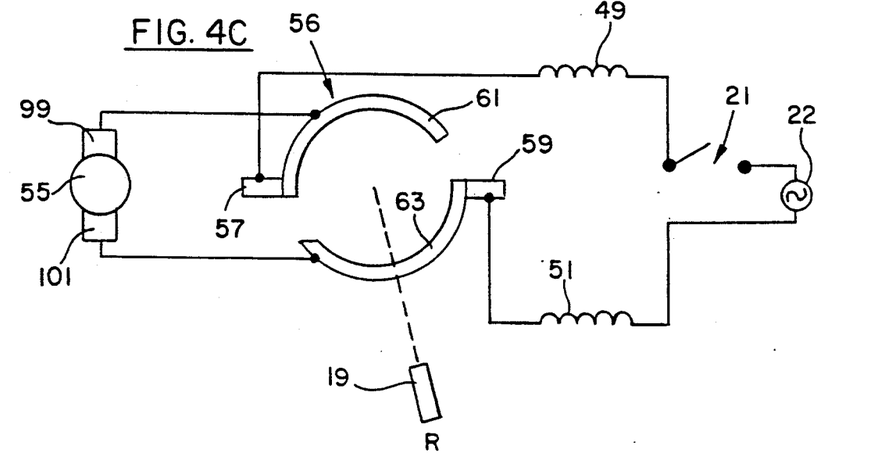

In brief, as shown in FIGS. 1, 4, the power tool 11 comprises a housing 13, a reversible motor 15, and a brush shifting and reversing switch assembly 17 for reversing the direction of rotation of motor 15. Assembly 17 includes a manual actuator 19 for operation of assembly 17. A trigger switch 21 connects and disconnects motor 21 to an a.c. or d.c. power source 22 which may be either a battery or line current.

In accordance with the invention, tool 11 comprises housing 13. As embodied herein, housing 13 (FIG. 1) has a pistol grip configuration and comprises an elongated motor section 23 having top, bottom, front and rear walls 25, 27, 29, 31. Section 23 encloses motor 15 (with an axis of rotation 33 extending generally in the direction of an elongation of section 23), assembly 17 and actuator 19. A handle section 35 extends laterally from bottom wall 27 of motor section 23 and has front and rear walls 37, 39.

In accordance with the invention, reversible motor 15 has a stator 43 and an armature 45 rotatable about axis 33. As embodied herein, motor 15 is preferably a conventional, universal motor. Motor 15 (FIGS. 1, 3) includes a pair of field or stator windings 49, 51, an armature or output shaft 53 and a commutator 55 at the rear end of armature 45.

Figure 5A:
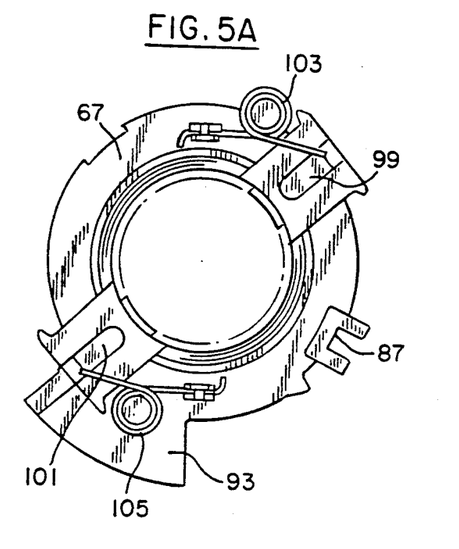
FIG. 5A is a rear elevational view of a rotatable support for the brush shifting and reversing switch assembly shown in FIG. 1.
Figure 5B:
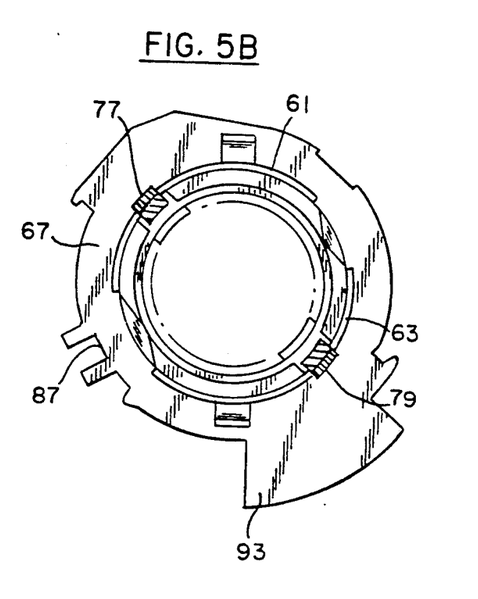
FIG. 5B is a front elevational view of the rotatable support shown in FIG. 5A.
Figure 6A:
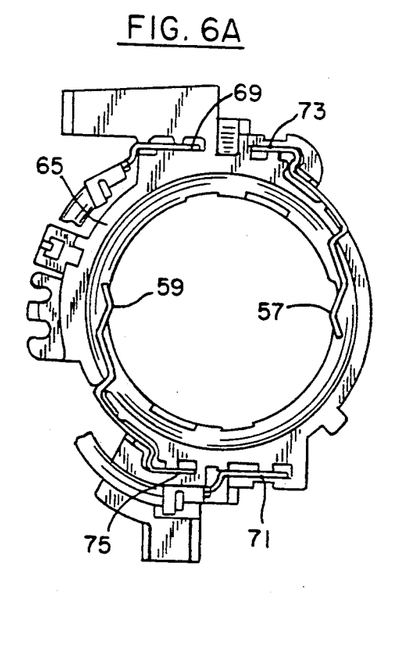
FIG. 6A is a rear elevational view of a fixed support of the brush shifting and reversing switch assembly shown in FIG. 1.
Figure 6B:
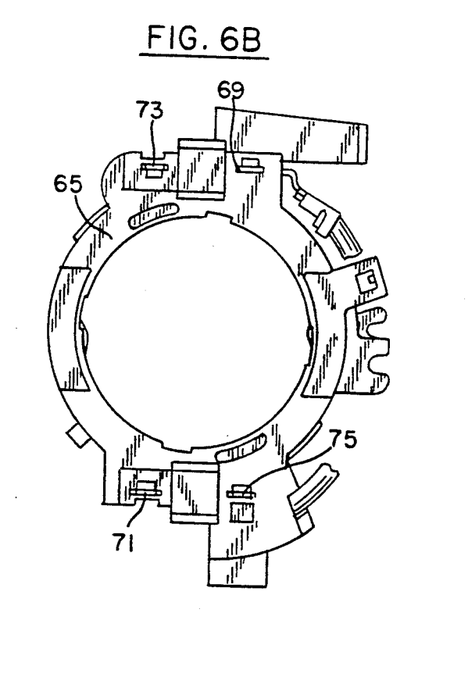
FIG. 6B is a front elevational view of the fixed support shown in FIG. 6A.

In accordance with the invention herein, tool 11 further comprises a reversing switch 56 for reversing the direction of rotation of armature 25. As shown best in FIGS. 2-6, switch 57 comprises a pair of fixed contacts 57, 59 connected to stator 43 and a pair of rotatable contacts 61, 63 connectable to armature 45. As embodied herein, switch 56 further comprises a ring shaped support 65 for fixed contacts 57, 59 and a ring shaped support 67 for rotatable contacts 61, 63. Ring 65 is fixed to stator 43 through two pairs of conventional plug-in connectors 69, 71 and 73, 75 (FIG. 6B). Connector 69 is connected between the first end of field coil 49 and one side of switch 21. Connector 71 is connected between a first end of field winding 51 and the other side of trigger switch 21. Connector 73 is connected between a second end of field winding 49 and first fixed winding contact 57. Connector 75 is connected between a second end of field winding 51 and second fixed winding contact 59.

Ring 67 is rotatably connected to fixed ring 65 by a pair of cantilevered spring arms 77, 79 (FIGS. 1, 5B) which extends from ring 67 and are snap fitted in ring 65. Rings 65, 67 form a relatively sealed enclosure for contacts 55, 59, 61, 63 to thereby shield reversing switch 56 from contamination and promote longer life and reliability of switch 56.

Figure 7A:
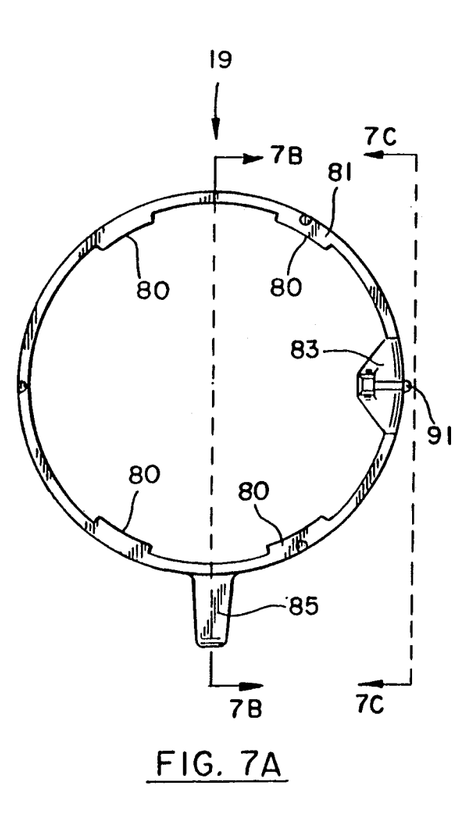
FIG. 7A is a rear elevational view, taken along line 7A—7A of FIG. 7C, of the actuator of the assembly for the power tool of FIG. 1.
Figure 7B:
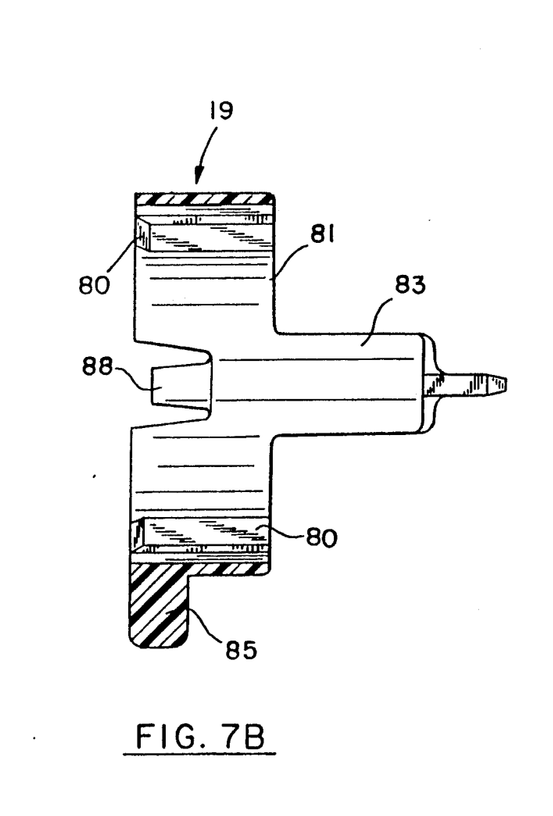
FIG. 7B is a cross sectional view of the actuator taken along line 7B—7B in FIG. 7A.
Figure 7C:
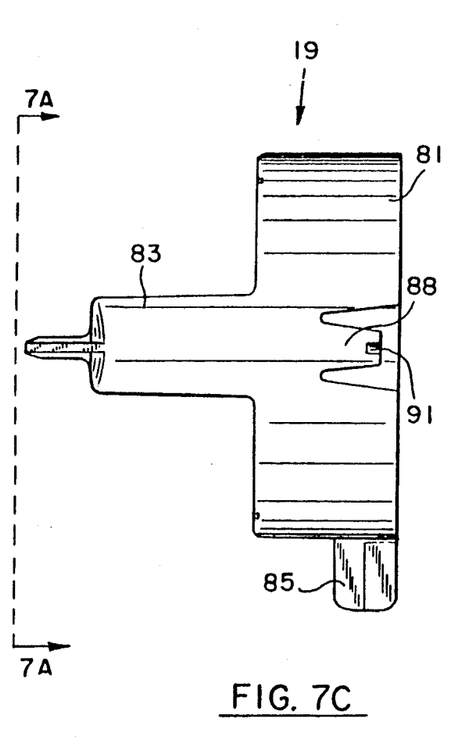
FIG. 7C is a side elevational view taken along line 7C—7C of FIG. 7A.

According to the invention, actuator 19 (FIGS. 1, 3, 7) is connected to the rotatable contacts 61, 63 and is movable between first (FIGS. 2B, 3B, 4B) and second (FIGS. 2C, 3C, 4C) positions for reversing the direction of rotation of armature 45. Actuator 19 comprises a sleeve 81 surrounding stator 43 and rotatable about armature axis 33. Sleeve 61 guides movement of actuator 19 between the first and second positions. As embodied herein, sleeve 81 is received in and guided by an annular channel 82 (FIG. 1) formed in motor section 23 and coaxial of armature axis 33. Channel 82 is defined by walls 84, 86. To further support and guide movement of sleeve 81 about axis 33, a plurality of ribs 80 (FIGS. 3, 7A, 7B), which are formed on the inner wall of sleeve 81, loosely and slidably engage the outer periphery of stator 43 (FIG. 1). The first (FIGS. 2B, 3B, 4B) and second (FIGS. 2C, 3C, 4C) positions of the actuator, correspond to the positions of reversing switch 56 which electrically connect motor 15 for operation in the forward and reverse directions, respectively.

Actuator 19 (FIGS. 1, 7) further comprises a cantilevered arm 83 rearwardly extending from sleeve 81 and a manually engagable radially outwardly extending tab 85. Arm 83 engages a U-shaped slot 87 formed on the periphery of rotatable contact support 67. Tab 85 extends outwardly from sleeve 81 through an opening 89 in the bottom wall 27 of motor section 23. Tab 85 is movable in opening 89 between first (FIG. 3B) and second (FIG. 3C) locations corresponding to the first (FIG. 2B) and second (FIG. 2C) actuator positions. As shown in FIG. 1, switch 21 extends through an opening 92 in handle section 35 which is adjacent to and downwardly and rearwardly of motor section opening 89. As will be apparent, tab 85 is thereby located just forward of trigger switch 21 in an ergonomically desirable location.

The forward and reverse positions of actuator 19 are defined by a detent formed between sleeve 81 and motor section 23. The detent is comprised of a cantilevered resilient finger 88 which has a bump 91 for seating in mating recesses 92 (FIGS. 3B, 3C) formed in the inner wall of motor section 23.

Figure 2A:
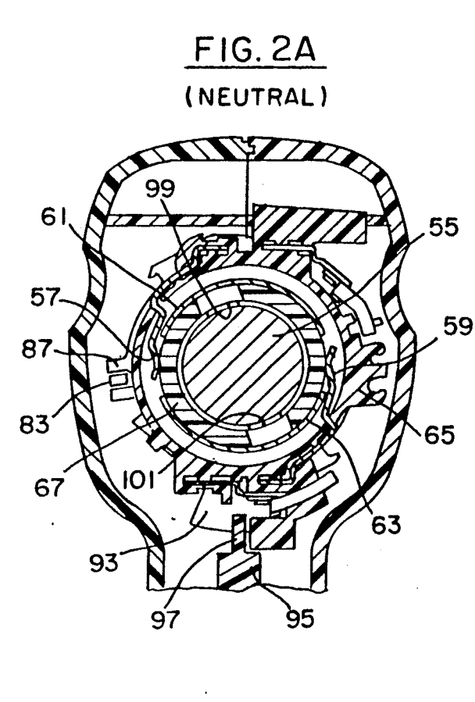
FIGS. 2A, 2B, and 2C are cross-sectional views taken along line 2—2 of FIG. 1 and illustrate, respectively, the neutral, forward, and reverse positions of the brush shifting and reversing switch assembly.
Figure 2B:
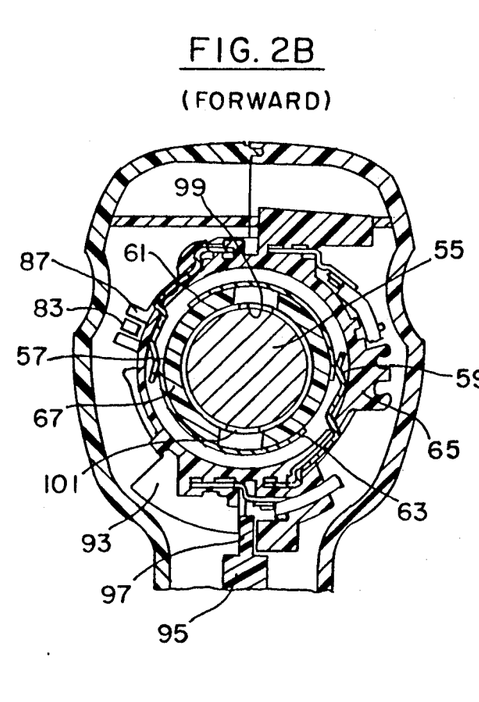
Figure 2C:
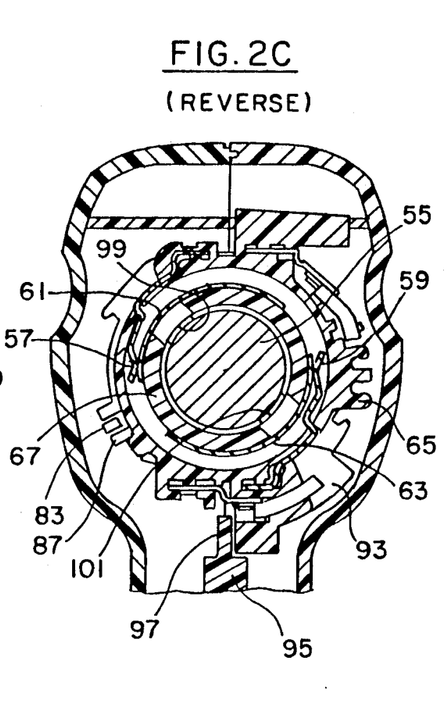
Figure 3A:
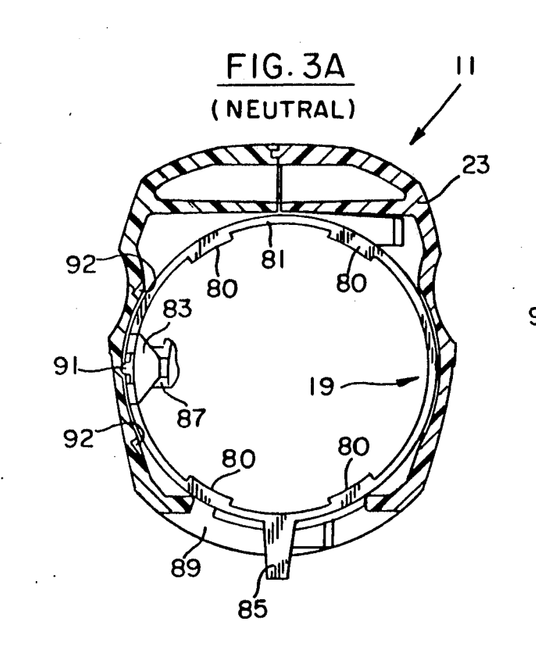
FIGS. 3A, 3B and 3C are a transverse cross-sectional view of the tool housing and the brush shifting and reversing switch assembly actuator taken along line 3—3 of FIG. 1 and illustrate, respectively, the neutral, forward and reverse positions of the actuator. For clarity, the motor and other components of the brush shifting and reversing switch assembly have been deleted.
Figure 3B:
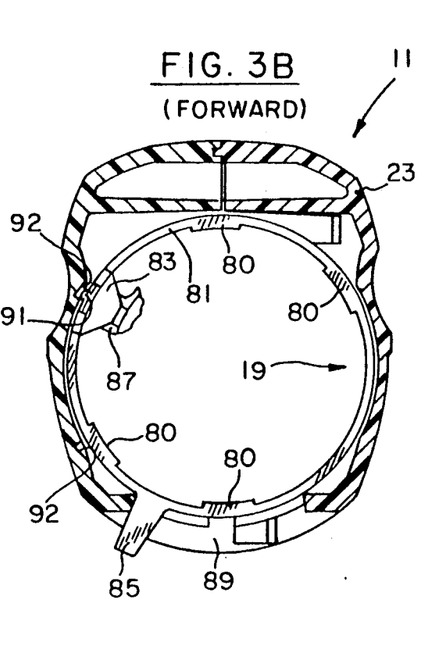
Figure 3C:
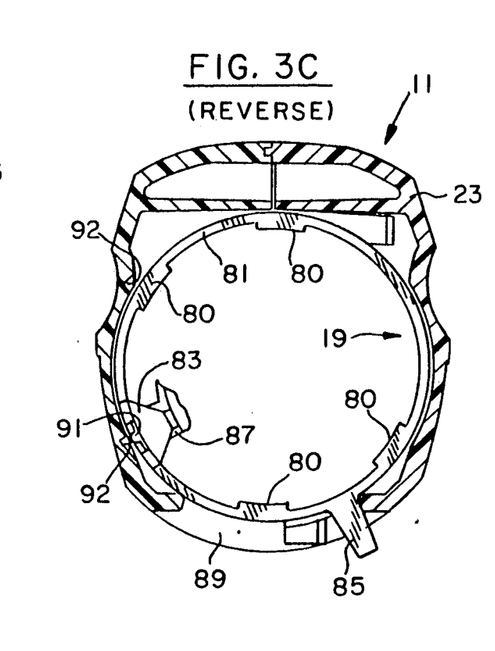

Manual switch 21 is for energizing motor 15 and includes a trigger 95 which is movable between and open and closed position. To prevent actuator 19 from being operated to reverse the direction of motor 15 while energized (commonly known as "plugging"), trigger 95 and rotatable ring 67 of reversing switch 17 are interlocked. As shown in FIGS. 1,2, the interlock is formed by a blocking tab 93 which extends from trigger 95 radially inwardly toward armature axis 33 and a projection 97 extending from ring 67 radially outward from axis 33. When trigger 95 is shifted rearwardly to close switch 21, blocking tab 93 is shifted into the path of movement of projection 97 preventing ring 67 from being shifted from either the first position (FIG. 3B) to the second position (FIG. 3C) or from the second position (FIG. 3C) to the first position (FIG. 3B). As shown in FIGS. 3A, 3B and 3C, reversing switch 57 has a substantial amount of travel between the forward and reverse positions to define an intermediate neutral position. The neutral position is necessary to provide sufficient separation between forward and reverse so that switch 17 may be discretely and stably locked in the forward and reverse positions.

In the preferred embodiment, ring 67 for rotatable contacts 63, 65 also serves as a brush support which (1) is movable about armature axis 33, (2) has a pair of brushes 99, 101 (FIG. 5A) disposed thereon and (3) is engagable with the armature commutator 55. Support 67 thus supports rotatable contacts 61, 63 and brushes 99, 101 for movement responsive to the movement of actuator 19 back and forth between the first and second positions which correspond respectively to the forward and reverse directions of rotation of the motor. Brush 99 is electrically connected to contact 61 via bias spring 103 (FIG. 5A). Brush 101 is electrically connected to contact 63 via bias spring 105 (FIG. 5B). In the first (forward) and the second (reverse) positions, brushes 99, 101 are located at the optimum position corresponding to the neutral plane of the magnetic field generated by coils 49, 51 when armature 45 is rotating. Thus, the required position of brushes 99, 101 for optimum motor performance will dictate the length of travel (corresponding to the neutral position in FIGS. 2A) of actuator 19 between the forward and reverse positions.

It will be recognized that while brushes 99, 101 and contacts 61, 63 are preferably mounted on unitary support 67, a separate support (not shown) may be provided for the contacts 61, 63 and for the brushes 99, 101.

In operation, initially actuator 19 may be located in the second position (FIGS. 3C, 4C) which electrically connects motor 15 for rotation in the reverse direction when trigger switch 21 is closed. In the second position (FIG. 4C) of actuator 19, fixed (winding) contact 57 and rotatable (brush) contact 61 are electrically connected and fixed (winding) contact 59 and rotatable (brush) contact 63 are electrically connected. Thus, current flows from power source 22 through switch 21, field winding 49, contact 57, contact 61, brush 99, commutator 55, brush 101, contact 63, contact 59, field winding 51, and switch 21. Brushes 99, 101 are positioned at a location corresponding to the neutral plane of the magnetic field generated by coils 49, 51 when armature 45 is driven in the reverse direction.

To move actuator 19 from the second to the first position, tab 85 is rotated clockwise in FIG. 3C. The movement of tab 85 is transmitted to rotatable support 67 through sleeve 81 and arm 83. Sleeve 81 is piloted on the outer diameter of stator 43 and in housing channel 82. Arm 83 is connected for rotary motion about armature axis 33 by engagement in slot 87 formed on the periphery of support 67. In the first position, contacts 57 and 63 are electrically connected and contacts 59 and 61 are electrically connected. Also, brushes 99, 101 are now shifted to a position corresponding to the neutral plane of the magnetic field generated by coils 49, 51 when armature 45 is rotated in the reverse direction. When switch 21 is closed, current flows through coil winding 49, contact 57, contact 61, brush 99, commutator 55, brush 101, contact 63, contact 59 and field winding 51 for rotation of motor 19 in the forward direction.

To prevent the "plugging" of motor 15, trigger 95 and rotatable ring 67 of reversing switch 17 are interlocked (i.e., only when switch 21 is closed). When trigger 95 is shifted to the rear to close switch 21, blocking tab 93 is positioned in the path of projection 97 extending from rotatable ring 67 and prevents movement of ring 67 from the first to the second position or from the second position to the first position.

In accordance with features of this invention, a compact, reliable shifting brush and/or reversing switch assembly with an improved ergonomic actuator is provided. First, because of the requirement for compactness, placing the actuator in the plane of the brushes 99, 101 would produce an ergonomically poor design. Users prefer an actuator location just forward of the power (trigger) switch. It will thus be appreciated that the assembly is particularly advantageous because by piloting the actuator on stator 43, actuator tab may be located in the ergonomically preferred position in front of trigger 95. Secondly, the assembly provides a compact strong mechanical linkage between the remotely located actuator tab 85 and the rotatable support 67 for brushes 99, 101 and rotatable contacts 63, 65 of reversing switch 17. Thirdly, the compact assembly is particularly advantageous in a pistol grip power tool in which a small size and easy portability are strongly preferred design goals. Lastly, the invention provides easy assembly and a reliable construction.

It will be apparent to those skilled in the art that various modifications and variations can be made in the power tool brush/reversing switch assembly of the present invention without departing from the scope or spirit of the invention. Thus, it is intended that the present invention cover these modifications and variations provided they come within the scope of the appended claims and their equivalents.

I claim:
1. A power tool comprising:
   a housing having front and rear ends;
   a reversible motor in the housing having (a) a stator and (b) an armature rotatable about an axis and having an output shaft and commutator at forward and rearward ends of the armature, respectively;
   a reversing switch for reversing the direction of rotation of the armature;
   said reversing switch surrounding the commutator and comprising a pair of fixed contacts connected to the stator and a pair of rotatable contacts connectable to the armature;
   a manual switch for energizing the motor, said manual switch extending from the housing;
   an actuator connected to the rotatable contacts and movable between first and second positions for reversing the direction of rotation of the armature; and
   said actuator comprising:
   (a) a sleeve spaced forwardly from the commutator, piloted on and surrounding the stator and rotatable about the armature axis, said sleeve guiding movement of the actuator between the first and second position; and
   (b) a manually engagable tab extending from the sleeve forwardly of and remote from the reversing switch, said tab movable between first and second locations corresponding to first and second actuator positions.

2. The tool of claim 1 further wherein:

said housing comprises an annular channel coaxial of the armature axis for receiving and guiding movement of the sleeve.

3. The tool of claim 1 wherein:
said reversing switch comprises a support for the rotatable contacts; and
said actuator comprises an arm extending from the sleeve and engaging the rotatable contact support.

4. The tool of claim 1 further comprising:
the housing comprising:
(1) an elongated motor section having top, bottom, front and rear walls, and enclosing (a) the motor with the armature axis extending generally in the direction of elongation of the motor section, (b) the reversing switch and (c) the actuator, the motor section having an opening through the bottom wall; and
(2) a handle section extending laterally from the bottom wall of the motor section and having a front wall and a rear wall, the handle section having an opening in the front wall adjacent to and downwardly and rearwardly of the motor section opening;
the manual switch extending through the handle section opening;
the tab extending outwardly from the sleeve through the motor section opening;
said reversing switch comprising a support for the rotatable contacts; and
said actuator comprising an arm extending rearwardly from the sleeve and engaging the rotatable contact support.

5. The tool of claim 1 wherein:
said manual switch comprising a blocking tab for engaging the reversing switch and blocking movement of the rotatable contacts when the manual switch is in the closed position.

6. The tool of claim 1 further comprising:
a brush support (a) movable about the armature axis, (b) having a pair of brushes disposed on the support and engagable with the armature, (c) engaging the actuator and (d) supporting the rotatable contacts and brushes for movement responsive to the movement of the actuator between the first and second positions.

7. The tool of claim 1 further comprising:
the housing comprising:
an elongated motor section having top, bottom, front and rear walls, and enclosing (a) the motor with the armature axis extending generally in the direction of elongation of the motor section, (b) the reversing switch and (c) the actuator, the motor section having an opening through the bottom wall; and
a handle section extending laterally from the bottom wall of the motor section and having a front wall and a rear wall, the handle section having an opening in the front wall adjacent to and downwardly and rearwardly of the motor section opening;
the manual switch extending through the handle section opening;
the tab extending outwardly from the sleeve through the motor section opening;
a pair of brushes mounted on the support and engagable with the armature;
said support engaging the actuator and supporting the rotatable contacts and brushes for movement responsive to the movement of the actuator between the first and second positions.

8. A power tool comprising:
a housing having front and rear ends;
a reversible motor comprising an armature having forward and rearward ends, an output shaft at the forward end of the armature, a commutator at the rearward end of the armature and a stator having a pair of field windings, each winding having first and second ends;
a manual switch for connecting and disconnecting the first end of each winding to a power source;
first and second spaced winding contacts fixed to the stator, each winding contact connected respectively to the second end of each winding;
a brush support rotatably movable relative to the winding contacts and having a pair of brushes and first and second brush contacts connected respectively to the brushes;
the winding contacts and the brush contacts comprising a reversing switch for reversing the direction of rotation of the motor, the reversing switch surrounding the commutator;
an actuator connected to the brush support and movable between (a) a first position wherein the first winding and brush contacts are connected and the second brush and winding contacts are connected for rotation of the motor in one direction and (b) a second position wherein the first winding and second brush contacts are connected and the second winding and the first brush contacts are connected for rotation of the motor in the opposite direction; and
said actuator comprising:
(a) a sleeve spaced forwardly from the commutator, piloted on and surrounding the stator and rotatable about the armature axis, said sleeve guiding movement of the actuator between the first and second positions; and
(b) a manually engagable tab extending from the sleeve forwardly of and remote from the reversing switch, said tab movable between first and second locations corresponding to first and second actuator positions.

9. A power tool comprising:
a reversible motor having (a) a stator and (b) an armature rotatable about an axis and having a commutator disposed at one end of the armature;
a brush support adjacent to the commutator, rotatably movable about the armature axis and having a pair of brushes disposed on the support and engagable with the commutator;
an actuator connected tot he brush support and rotatable about the armature axis between first and second positions corresponding to the forward and reverse directions of rotation of the motor armature; and
said actuator comprising:
(a) a sleeve spaced forwardly from the commutator, piloted on and surrounding the stator and rotatable about the armature axis, said sleeve guiding movement of the actuator between the first and second positions; and
(b) a manually engagable tab extending from the sleeve forwardly of and remote from the brush support, said tab movable between first and second locations corresponding to first and second actuator positions.

* * * * *